US007085751B2

(12) United States Patent
Finlay et al.

(10) Patent No.: US 7,085,751 B2
(45) Date of Patent: Aug. 1, 2006

(54) QUERY EXECUTION IN QUERY PROCESSING SYSTEMS

(75) Inventors: Ian R. Finlay, Ontario (CA); Bruce G. Lindsay, San Jose, CA (US); Guy M. Lohman, San Jose, CA (US); David C. Sharpe, Ontario (CA); Daniel C. Zilio, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 09/757,427

(22) Filed: Jan. 10, 2001

(65) Prior Publication Data

US 2001/0047350 A1   Nov. 29, 2001

(30) Foreign Application Priority Data

Apr. 28, 2000   (CA)   ................................. 2,306,946

(51) Int. Cl.
*G06F 7/00*   (2006.01)
*G06F 17/00*   (2006.01)
(52) U.S. Cl. .................. 707/1; 707/3; 707/10; 707/102
(58) Field of Classification Search ............... 707/1–10
See application file for complete search history.

(56) References Cited

U.S. PATENT DOCUMENTS

| | | | | |
|---|---|---|---|---|
| 5,317,731 A | * | 5/1994 | Dias et al. ...................... 707/8 |
| 5,495,601 A | * | 2/1996 | Narang et al. .................. 707/8 |
| 5,517,641 A | * | 5/1996 | Barry et al. ................. 707/101 |
| 5,758,149 A | * | 5/1998 | Bierma et al. .................. 707/8 |
| 5,822,749 A | * | 10/1998 | Agarwal ........................ 707/3 |
| 5,835,904 A | * | 11/1998 | Vicik et al. .................... 707/1 |
| 5,924,088 A | | 7/1999 | Jakobson ....................... 707/2 |
| 6,012,054 A | | 1/2000 | Seputis ......................... 707/3 |
| 6,081,799 A | * | 6/2000 | Beavin et al. .................. 707/3 |
| 6,321,234 B1 | * | 11/2001 | Debrunner .................. 707/202 |
| 6,353,820 B1 | * | 3/2002 | Edwards et al. ............... 707/2 |
| 6,363,387 B1 | * | 3/2002 | Ponnekanti et al. .......... 707/10 |
| 6,557,082 B1 | * | 4/2003 | Josten et al. ................ 707/201 |

* cited by examiner

*Primary Examiner*—Jean M. Corrielus
*Assistant Examiner*—Anh Ly
(74) *Attorney, Agent, or Firm*—Sawyer Law Group LLP

(57) ABSTRACT

A query processing system having a data manager, and a query manager also includes a buffer. The query manager calls the data manager to access data based on a query. Where there is no predicate check or consumption operation on the record accessed, the data manager will notionally return the record to the query manager. However, the data manager accomplishes the return by writing the relevant portions of the record to a buffer. The data manager maintains stabilization of the page containing the record while the buffer is being written to. The data manager continues to access records on the stabilized page and to write such records to the buffer where appropriate. The query manager retrieves the records from the buffer after the data manager has completed its operation resulting from the query manager call.

12 Claims, 1 Drawing Sheet

QUERY EXECUTION IN QUERY PROCESSING SYSTEMS

FIELD OF THE INVENTION

The present invention is directed to an improvement in computing systems and in particular to improved query execution in query processing systems, such as relational data bases.

BACKGROUND OF THE INVENTION

In query processing systems, such as relational data base management systems (RDBMS), data values are extracted from stored representation of the data for further processing by the query evaluation system. Typically, and in RDBMS systems, the data is structured as rows comprised of column values. The rows are grouped into contiguous storage blocks known as pages. A part of query evaluation in such systems is the isolation of successive rows and extraction of a subset of the column values for the row. These values are used in query evaluation steps which may include one or more of filtering, sorting, grouping, joining, or other relational or data manipulation steps. Copying the data values from data pages involves the step of identifying and locating in main memory the page containing the row of interest, locating the row within the page and locating the column values within the row. The column values are then copied to new locations in memory where they are made available for query evaluation. Typically a page may be located in the main memory of a computer or located on a secondary storage device, typically a computer disk. In query evaluation systems which support concurrent query executions, the page containing data must be "stabilized" to ensure that it remains at the same location in memory and to prevent concurrent updates to the page to preserve the logical integrity of the page contents, while it is being accessed by a particular process or thread. After copying column data values to a new location, the page stabilization is ended (released). The steps of locating the page, stabilizing the page, locating a row in the page, and releasing the stabilization for each row to be processed by the query evaluation system, may constitute a significant portion of the overall execution cost of a query.

In the prior art, techniques are known to improve the efficiency of query execution by reducing the repeated location and stabilization of pages containing data. Efficiencies may be realized where a page is located and then remains stabilized for successive read operations. These approaches include search argument processing in which an evaluation of a retrieved row relative to a query predicate is performed prior to the release of the stabilization of the page containing the row. Where the row being retrieved does not meet the query predicate condition, the next row is retrieved from the page. This method permits multiple rows to be read from the page without releasing and reacquiring the stabilization on the page. However, where rows are located in the page which do satisfy the query predicate, the data values are copied for processing by the query processor and the stabilization on the page is released. Thus where the query predicate is satisfied, there is no increased efficiency resulting from the adoption of the above approach.

It is therefore desirable to have a query execution technique which provides increased efficiency of the query execution where query predicates are satisfied by retrieved rows.

SUMMARY OF THE INVENTION

According to one aspect of the present invention, there is provided a query execution in a query processing system having improved efficiency.

According to another aspect of the present invention, there is provided a method for processing a database query in a database management system comprising a data manager, a set of data, a query processor, and a buffer, the method comprising the steps of:

the query processor calling the data manager to request the return of data from the set of data, the data manager accessing the set of data to locate query-specified data and determining if the query-specified data is to be ignored, consumed, or returned to the query processor, where the data manager determines that the query-specified data is to be returned to the query processor, the data manager writing the query-specified data to the buffer, the data manager repeating access to the set of data until all data requested by the query processor has been accessed, and the query processor retrieving query-specified data from the buffer.

According to another aspect of the present invention, there is provided the above method, in which the set of data is stored on pages and the method further comprises the step of the data manager stabilizing the page on which the query-specified data is located prior to accessing said data, the method further comprising the step of maintaining the stabilization of the page while writing to the buffer and until all data requested by the query processor on the page has been accessed.

According to another aspect of the present invention, there is provided a program storage device readable by a machine, tangibly embodying a program of instructions executable by the machine to perform the above method steps.

According to another aspect of the present invention, there is provided a computer program product for a database management system comprising a data manager, a query processor and a buffer for processing a database query a set of data, the computer program product comprising a computer usable medium having computer readable code means embodied in said medium, comprising:

computer readable program code means for the query processor to call the data manager to request the return of data from the set of data, computer readable program code means for the data manager to access the set of data to locate query-specified data and to determine if the query-specified data is to be ignored, consumed, or returned to the query processor, computer readable program code means for, where the data manager determines that the query-specified data is to be returned to the query processor, the data manager to write the query-specified data to the buffer, and for the data manager to repeat access to the set of data until all data requested by the query processor has been accessed, and computer readable program code means for the query processor to retrieve query-specified data from the buffer.

According to another aspect of the present invention, there is provided the above computer program product, in which the set of data is stored on pages and in which the computer usable medium having computer readable code means embodied in said medium, further comprises computer readable program code means for the data manager to stabilize the page on which the query-specified data is located prior to accessing said data, and for the data manager to maintain the stabilization of the page while writing to the buffer and until all data requested by the query processor on the page has been accessed According to another aspect of the present invention, there is provided a query processing system comprising a data manager, a query processor and a buffer for processing a database query on a set of data, the query processor comprising means for calling the data manager to request the return of data from the set of data, the data manager comprising means for accessing the set of data to locate query-specified data and for determining if the query-specified data is to be ignored, consumed, or returned to the query processor, the data manager comprising means for, where determining that the query-specified data is to be returned to the query processor, writing the query-specified data to the buffer, the data manager repeating access to the set of data until all data requested by the query processor has been accessed, and the query processor comprising means for retrieving query-specified data from the buffer.

According to another aspect of the invention there is provided the above query processing system, in which the set of data is stored on pages and the data manager further comprises means for stabilizing the page on which the query-specified data is located prior to accessing said data, the data manager further comprising means for maintaining the stabilization of the page while writing to the buffer and until all data requested by the query processor on the page has been accessed.

Advantages of the present invention include a query execution technique requiring reduced page stabilization and improved processor utilization.

BRIEF DESCRIPTION OF THE DRAWING

The preferred embodiment of the invention is shown in the drawing, wherein.

Figure 1:
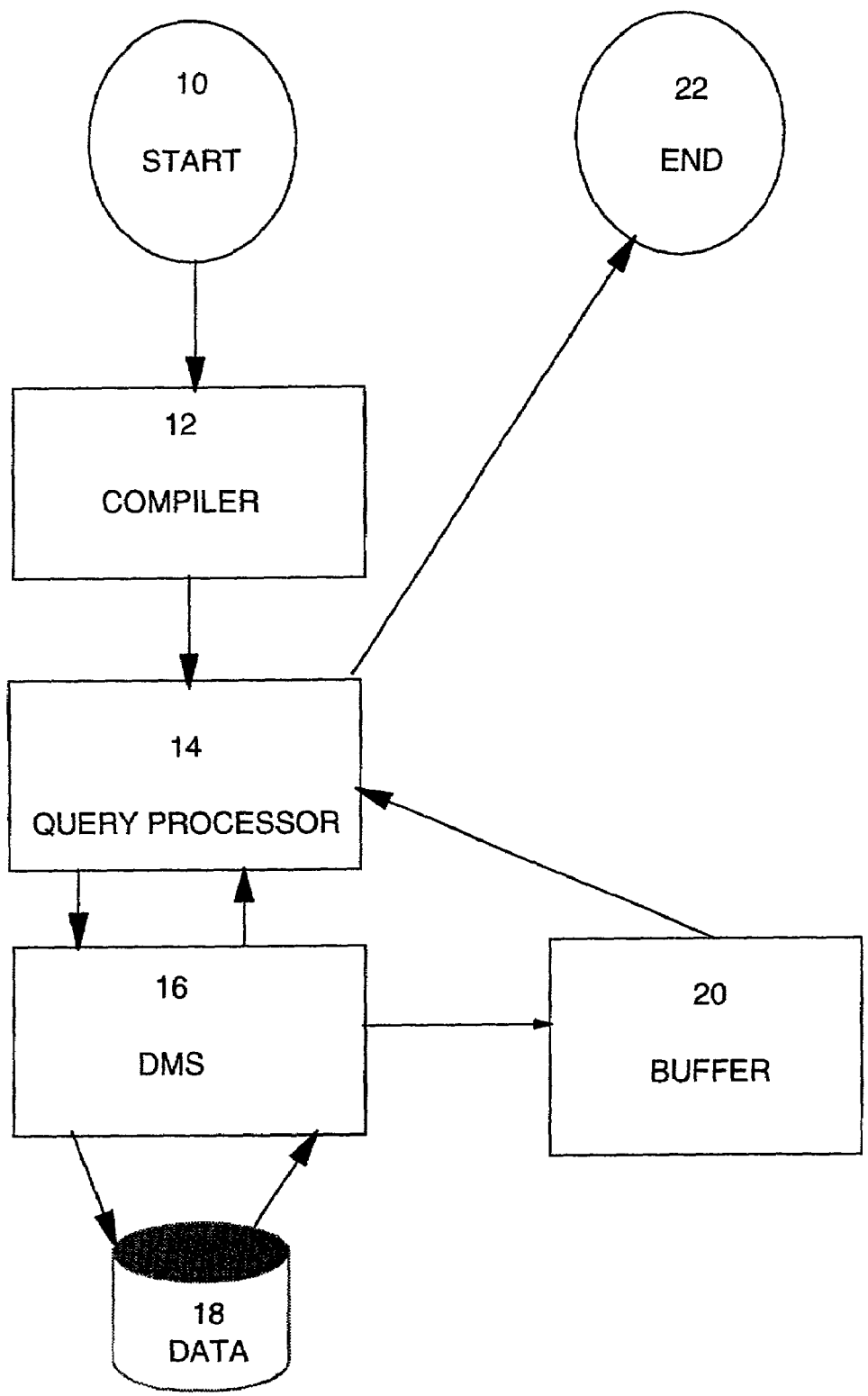
FIG. 1 is a flow chart illustrating the steps in query interpretation using the preferred embodiment of the invention.

In the drawing, the preferred embodiment of the invention is illustrated by way of example. It is to be expressly understood that the description and drawing are only for the purpose of illustration and as an aid to understanding, and are not intended as a definition of the limits of the invention.

DETAILED DESCRIPTION

FIG. 1 is a flow chart diagram illustrating steps in interpreting a query in accordance with the preferred embodiment of the invention. Start 10 represents queries, such as SQL statements, that are processed to access data in a database. In the example architecture of the preferred embodiment, queries are first processed by compiler 12. Compiler 12 provides, query processor 14 with an access plan based on the nature of the SQL query being compiled. As required, query processor 14 calls data manager (data management system or DMS) 16 to obtain access to data table 18 (the step of accessing data table 18 is sometimes termed a data scan). In the preferred embodiment records or rows of data are stored on pages in data table 18. In the preferred embodiment, rows of data table 18 are available for copying to buffer 20.

In query processing systems that support concurrent access to data, the location and stabilization of a page containing data is a potentially expensive operation. Each time that data management system 16 stabilizes a page in data 18, and locates (using a notional cursor in the preferred embodiment) a row or record position in the page in data 18, there will be a resulting time cost introduced in the processing of the query. The prior art includes techniques to allow multiple rows to be read from the same page in data 18 without releasing the stabilization or losing the location in the page. These techniques are typically applied, however, where column data for a row in the table of data 18 is not returned to query processor 14. Therefore, where a series of rows are read from the table of data 18 and column values for each row are, in fact, returned to query processor 14, there is a repeated time cost involved in data management system 16 repeatedly stabilizing the page and locating the relevant rows in the page.

To improve query execution efficiency where row data is returned to query processor 14, the preferred embodiment has buffer 20 that is available for use where rows are read from data 18 and are to be returned to query processor 14. According to the preferred embodiment, buffer 20 will be used where such techniques as search argument processing do not prevent row data being returned to query processor 14. Whereas in the prior art, the stabilization of the page containing the row in data 18 is released when a row is returned, in the preferred embodiment the retrieved column data for the row is copied from data table 18 to buffer 20, rather than being returned directly to query processor 14. The page stabilization is not automatically released.

As will be apparent, use of buffer 20 incorporates the additional steps of copying data values in the query execution process. In certain circumstances, however, despite the added cost associated with the copying of data values to the buffer efficiencies are realized by a reduction in page stabilization steps required. In addition, the code which is executed to implement the steps of copying data values to a buffer is anticipated to be significantly smaller than the code required to copy data values for use by query processor 14. As a result, instruction and data references are localized which results in improved processor utilization and therefore additional efficiencies in the query execution, itself. For these reasons the use of buffer 20 potentially improves performance for a query execution.

Use of buffer 20 may not be advantageous in all circumstances. Factors which influence the use of such a technique include the extent of resource usage and time cost inherent in the copying steps and the amount of data estimated to be returned from the data scanning access method. Where data found on each page is limited, the advantages of buffer 20 are reduced.

In the preferred embodiment, query processor 14 is designed to ensure that data is retrieved from buffer 20 in an appropriate manner. As will be apparent, data may be copied to buffer 20 in response to a query processor 14 called to data management system 16 in a manner which results in buffer 20 being partially filled, or in buffer 20 being completely filled. In the implementation of the preferred embodiment, where buffer 20 is completely filled, it is also possible for an "extra" set of data values (an extra row from the table) to be retrieved by data manager 16.

Query processor 14 is implemented to process both the "extra" row and the rows in buffer 20. Where the access plan created by compiler 12 requires that the processing of the data maintain the sequential order of the rows, the "extra" row must be processed after the rows in buffer 20. To accommodate this, the preferred embodiment saves the "extra" row to a single row buffer (not shown) to permit these values to be copied to the locations in memory for subsequent query evaluation operations.

Where the data values returned by way of buffer 20 are of a size to precisely fit buffer 20, there will be no "extra" row returned by the DMS. A flag must be set to permit the query processor 14 to recognize that rows exist in buffer 20 and to process these rows.

The following pseudo code description sets out an implementation of the copying of a row from page 18 to buffer 20.

```
DataCopySarg(RelevantCols/*refs to col vals of current row*/)
   if (BufferEmpty=TRUE)
      BufferUsed=0;
      BufferConsumed=0;
      BufferEmpty=FALSE;
   RowSize=sum(sizeof(relevantCols));
   if(RowSize<=BufferSize-BufferUsed)
   Copy from relevantCols to Buffer[BufferUsed];
   BufferUsed=BufferUsed+RowSize;
   return(CONSUMED);
   else
   return(DONE)//buffer full. Access method must copy
   //column values & return to query eval
   QueryEvalRowScanner( )
   if(BufferEmpty=FALSE)
   if(BufferUsed>BufferConsumed)
   Copy from Buffer(BufferConsumed) to HomeBuffers;
   RowSize=sum(sizeof(copied columns));
   BufferConsumed=BufferConsumed+RowSize;
   else
   Copy from ExtraRow to HomeBuffers;
   BufferEmpty=TRUE;
   return(ROW_AVAILABLE);
   else if (SeeEOF=TRUE)
   return(EOF);
   else// not non-empty buffer or EOF
   AccMethResult=accessMethod(getNext);if
      (AccMethResult=EOF)if(BufferEmpty==FALSE)
   SeenEOF=TRUE;
   Copy from Buffer(BufferConsumed) to HomeBuffers;
   RowSize=sum(sizedof(copied columns));
   BufferConsumed=BufferConsumed+RowSize;    return
(ROW_AVAILABLE);
   else
   return(EOF);
   else//not EOF from access method
   Copy from HomeBuffers to ExtraRow;
```

The following table sets out the characteristics of the data objects referred to in the above pseudo-code description of the implementation:

| NAME | DESCRIPTION |
|---|---|
| Buffer | The multi-row buffer. The size of the multi-row buffer is optimised based on the number of rows expected, the sizes of the column data values, and the cost of dedicating memory to the multi-row buffer. |
| ExtraRow | Buffer for the "extra" row returned by that data scanning access method |
| BufferSize | The size, in bytes, of the multi-row buffer |
| BufferUsed | The amount, in bytes, of the multi-row buffer currently containing data column values from zero or more rows |
| Buffer Consumed | The amount, in bytes, consumer from the multi-row buffer. Should be less than or equal to BufferUsed |
| BufferEmpty | A flag indicating that the multi-row buffer is empty |
| SeenEOF | A flag indicating that the scanning access method has reported that there are no more rows |
| HomeBuffers | The locations in memory designated to receive the relevant data column values of a scanning access method |

| NAME | DESCRIPTION |
|---|---|
| RelevantCols | The locations in the current page of the scanning access method of the columns needed by the copying SARG operator |

The following table sets out details of certain procedures referred to in the pseudo-code example set out above:

| | |
|---|---|
| Create home buffers | The home locations for the relevant column values of rows identified by a data scanning access method must be determined and communicated to both the data scanning access method and the query processor. |
| Prepare HomeBuffers list | The list of home buffers must be prepared for use by the copying SARG operation mechanism. |
| Create Buffer and buffer control information | The multi-row buffer must be created and the BufferEmpty and SeenEOF flags must be set to true and false respectively. |
| Prepare SARG processor directives | The information used to control the SARG processor must be prepared to include the indication that the copying SARG operator is to be invoked if all the predicates are TRUE. |

As the above example implementation indicates, the code for use of buffer 20 is potentially limited and may run in a tight loop with both code and data kept in cache close to a computer processor. Fr this reason, the use of buffer 20 for certain queries will improve performance of the processing of the query.

Although a preferred embodiment of the present invention has been described here in detail, it will be appreciated by those skilled in the art, that variations may be made thereto. Such variations may be made without departing from the spirit of the invention or the scope of the appended claims.

What is claimed is:

1. A method for processing a database query on a set of data stored on a plurality of data pages in a database management system, the method comprising the steps of:
   a) utilizing a query processor to call a data manager and request a result of data from the set of data;
   b) allowing the data manager to locate and access query-specified data on a stabilized data page and make a determination regarding the query-specified data, the data page being stabilized to prevent concurrent updates to the data page to preserve a logical integrity of contents of the data page while the data manager is accessing the data page;
   c) utilizing the data manager to write all the query-specified data on the stabilized data page to a buffer based on the determination while maintaining the stabilization of the data page; and
   d) utilizing the query processor to retrieve the query-specified data from the buffer.

2. The method of claim 1 wherein the determination involves determining whether the query-specified data is to be ignored, consumed, or returned to the query processor.

3. The method of claim 2 wherein the determination is that the query-specified data is to be returned to the query processor.

4. A system for processing a database query on a set of data stored on a plurality of data pages in a database management system, the system comprising:

a data manager;

a query processor comprising means to call the data manager and request a result of data from the set of data;

means for allowing the data manager to locate and access query-specified data stabilized data page and make a determination regarding the query-specified data, the data page being stabilized to prevent concurrent updates to the data page to preserve a logical integrity of contents of the data page while the data manager is accessing the data page;

means for utilizing the data manager to write all the query-specified data on the stabilized data page to a buffer based on the determination while maintaining the stabilization of the data page; and means for utilizing the query processor to retrieve the query-specified data from the buffer.

5. The system of claim 4 wherein the determination involves determining whether the query-specified data is to be ignored, consumed, or returned to the query processor.

6. The system of claim 5 wherein the determination is that the query-specified data is to be returned to the query processor.

7. A computer readable medium containing program instructions for processing a data query on a set of data stored on a plurality of data pages in a database management system, the program instructions comprising the steps of:

a) utilizing a query processor to call a data manager and request a result of data from the set of data;

b) allowing the data manager to locate and access query-specified data on a stabilized data page and make a determination regarding the query-specified data, the data page being stabilized to prevent concurrent updates to the data page to preserve a logical integrity of contents of the data page while the data manager is accessing the data page;

c) utilizing the data manager to write all the query-specified data on the stabilized data page to a buffer based on the determination while maintaining the stabilization of the data page; and d) utilizing the query processor to retrieve the query-specified data from the buffer.

8. The computer readable medium of claim 7 wherein the determination involves determining whether the query-specified data is to be ignored, consumed, or returned to the query processor.

9. The computer readable medium of claim 8 wherein the determination is that the query-specified data is to be returned to the query processor.

10. A method for processing a database query on a set of data stored on a plurality of data pages in a database management system, the method comprising the steps of:

a) utilizing a query processor to call a data manager and request a result of data from the set of data;

b) allowing the data manager to locate query-specified data by:

b1) locating a data page containing query-specified data;

b2) stabilizing the data page; and b3) accessing the data page, wherein the data page is stabilized to prevent concurrent updates to the data page to preserve a logical integrity of contents of the data page while the data manager is accessing the data page;

c) utilizing the data manager to make a determination regarding the query-specified data and to write the query-specified data on the stabilized data page to a buffer based on the determination while maintaining the stabilization of the data page; and d) utilizing the query processor to retrieve the query-specified data from the buffer.

11. A system for processing a database query on a set of data stored on a plurality of data pages in a database management system, the system comprising:

a data manager;

a query processor comprising means to call a data manager and request a result of data from the set of data;

means for allowing the data manager to locate query-specified data by:

means for locating a data page containing query-specified data;

means stabilizing the data page; and means for accessing the data page, wherein the data page is stabilized to prevent concurrent updates to the data page to preserve a logical integrity of contents of the data page while the data manager is accessing the data page;

means for utilizing the data manager to make a determination regarding the query-specified data and to write the query-specified data on the stabilized data page to a buffer based on the determination while maintaining the stabilization of the data page; and means for utilizing the query processor to retrieve the query-specified data from the buffer.

12. A computer readable medium containing program instructions for processing a database query on a set of data stored on a plurality of data pages in a database management system, the program instructions comprising the steps of:

a) utilizing a query processor to call a data manager and request a result of data from the set of data;

b) allowing the data manager to locate query-specified data by:

b1) locating a data page containing query-specified data;

b2) stabilizing the data page; and b3) accessing the data page, wherein the data page is stabilized to prevent concurrent updates to the data page to preserve a logical integrity of contents of the data page while the data manager is accessing the data page;

c) utilizing the data manager to make a determination regarding the query-specified data and to write the query-specified data on the stabilized data page to a buffer based on the determination while maintaining the stabilization of the data page; and d) utilizing the query processor to retrieve the query-specified data from the buffer.

* * * * *

UNITED STATES PATENT AND TRADEMARK OFFICE
CERTIFICATE OF CORRECTION

| | | |
|---|---|---|
| PATENT NO. | : 7,085,751 B2 | Page 1 of 1 |
| APPLICATION NO. | : 09/757427 | |
| DATED | : August 1, 2006 | |
| INVENTOR(S) | : Finlay et al. | |

It is certified that error appears in the above-identified patent and that said Letters Patent is hereby corrected as shown below:

In column 8, line 16, delete "a data" and replace with -- the data--.

Signed and Sealed this

Twenty-first Day of November, 2006

JON W. DUDAS
*Director of the United States Patent and Trademark Office*